(12) United States Patent
Li et al.

(10) Patent No.: US 9,639,441 B2
(45) Date of Patent: May 2, 2017

(54) SOLID-STATE STORAGE SYSTEM, APPARATUS AND METHOD OF WRITING DATA

(71) Applicant: RAMAXEL TECHNOLOGY (SHENZHEN) LIMITED, Shenzhen (CN)

(72) Inventors: Jian Li, Shenzhen (CN); Weihua Xu, Shenzhen (CN)

(73) Assignee: RAMAXEL TECHNOLOGY (SHENZHEN) LIMITED, Shenzhen (CN)

(*) Notice: Subject to any disclaimer, the term of this patent is extended or adjusted under 35 U.S.C. 154(b) by 66 days.

(21) Appl. No.: 14/650,648

(22) PCT Filed: Jun. 18, 2013

(86) PCT No.: PCT/CN2013/077392
§ 371 (c)(1),
(2) Date: Jun. 9, 2015

(87) PCT Pub. No.: WO2014/101375
PCT Pub. Date: Jul. 3, 2014

(65) Prior Publication Data
US 2016/0210210 A1    Jul. 21, 2016

(30) Foreign Application Priority Data
Dec. 31, 2012 (CN) .......................... 2012 1 0591581

(51) Int. Cl.
*G06F 11/00* (2006.01)
*G06F 11/20* (2006.01)
(Continued)

(52) U.S. Cl.
CPC .......... *G06F 11/2069* (2013.01); *G06F 3/064* (2013.01); *G06F 3/0619* (2013.01);
(Continued)

(58) Field of Classification Search
CPC ............ G06F 11/1076; G06F 11/1004; G06F 11/1471; G06F 11/108; G06F 11/16
See application file for complete search history.

(56) References Cited

U.S. PATENT DOCUMENTS 7,657,796 B1 * 2/2010 Kaiser ................. G06F 11/1435
707/821
7,917,803 B2    3/2011 Stefanus et al.
(Continued)

FOREIGN PATENT DOCUMENTS

CN    1612119 A    5/2005
CN    1845082 A    10/2006
(Continued)

*Primary Examiner* — Charles Ehne
(74) *Attorney, Agent, or Firm* — Maschoff Brennan

(57) ABSTRACT

Provided is a method of writing data to a solid-state storage system, wherein the solid-state storage system comprises several logical disks. The method comprises the steps of: from each of the logical disks, allocating at least one idle logic block used for receiving parallel data, wherein each of the logic blocks comprises several logical pages; setting the logical pages with a same page number in respective logic block as one RAID stripe, wherein each RAID stripe is used for storing a set of parallel data and verification information associated with the parallel data; and when data in one of the logical pages is damaged, calculating and restoring the damaged data based on the other data and the associated verification information stored in the RAID stripe where the logical page is located. The present invention also provides a solid-state storage system for implementing the above-mentioned method.

6 Claims, 4 Drawing Sheets

(51) Int. Cl.
*G06F 11/10* (2006.01)
*G06F 3/06* (2006.01)

(52) U.S. Cl.
CPC ........ *G06F 3/0689* (2013.01); *G06F 11/1004* (2013.01); *G06F 11/108* (2013.01); *G06F 11/1076* (2013.01); *G06F 2201/805* (2013.01)

(56) References Cited

U.S. PATENT DOCUMENTS

2003/0167439 A1* 9/2003 Talagala .............. G06F 11/1076
714/770
2009/0150599 A1* 6/2009 Bennett ............... G06F 11/1441
711/103

FOREIGN PATENT DOCUMENTS

| CN | 101025715 A | 8/2007 |
| CN | 102591807 A | 7/2012 |
| CN | 103092765 A | 5/2013 |

* cited by examiner

SOLID-STATE STORAGE SYSTEM, APPARATUS AND METHOD OF WRITING DATA

TECHNICAL FIELD

The present invention relates to the field of storage technologies, and particularly to a solid-state storage system, an apparatus and a method of writing data.

BACKGROUND

Comparing with an SLC (Single-Level Cell) Nand Flash, an MLC (Multi-Level Cell) Nand Flash has a higher storage density and has been used more widely in the field of solid-state hard disks. In one memory cell of an MLC Nand Flash, 2 bits of information can stored. The 2 bits belong to two different pages, respectively. Such a pair of pages is called as couple pages, of which a page for storing a low bit is called as a low page and the other page for storing a high bit is called as an up page. The couple pages are subjected to two constraints as follows during a process of writing: 1) the low page must be written before the up page is written; and 2) if the writing to the up page is interrupted by, for example, abnormal power down during the process of writing, information on the up page will be lost and information on the corresponding low page may also be lost, but the low page will not affect the corresponding up page.

As a solution, the prior art additionally provides a standby power supply or super capacitor to enable the data, which is currently being written, to be successfully written to a Nand Flash when a main power supply is down. However, this solution requires the provision of an external hardware support, increasing the cost and complexity of hardware.

To sum up, the existing methods of writing data to a solid-state storage system is obviously inconvenient and deficient in an practical application thereof, thus it is necessary to to make an improvement.

SUMMARY

To overcome the above-mentioned defects, it is an object of the present invention to provide a solid-state storage system, an apparatus and a method of writing data, which can restore the damaged data without additionally increasing hardware cost.

To this end, the present invention provides a method of writing data to a solid-state storage system which comprises several logical disks, the method comprising the steps of:

from each of the logical disks, allocating at least one idle logic block used for receiving parallel data, wherein each of the logic blocks comprises several logical pages;

setting the logical pages with a same page number in respective logic block as one RAID stripe, wherein each RAID stripe is used for storing a set of parallel data and verification information associated with the parallel data; and when data in one of the logical pages is damaged, calculating and restoring the damaged data based on the other data and the associated verification information stored in the RAID stripe where the logical page is located.

In accordance with the method of writing data according to the present invention, a memory cell of the logic block comprises two of the logical pages that are adjacent to each other, one of which is used for storing low data, and the other one is used for storing high data.

In accordance with the method of writing data according to the present invention, the step of, when data in one of the logical pages is damaged, calculating and restoring the damaged data based on the other data and the associated verification information stored in the RAID stripe where the logical page is located comprises the step of:

when the writing of the high data damages the corresponding low data, calculating and restoring the damaged data based on the other data and associated verification information stored in the RAID stripe where the low data is located.

In accordance with the method of writing data according to the present invention, the method further comprises the step of:

if respective logic block for receiving parallel data comprises logical pages which are used for storing high data and have the same page number, selecting one of the logical pages to receive the written data and blocking a request for writing data to the other logical pages with the same page number.

The present invention further provides a solid-state storage system comprising several logical disks, the storage system further comprising:

an allocation module configured for allocating at least one idle logic block from each of the logical disks, wherein the idle logic block is used for receiving parallel data, and wherein each of the logic blocks comprises several logical pages;

a setting module configured for setting the logical pages with a same page number in respective logic block as one RAID stripe, wherein each RAID stripe is used for storing a set of parallel data and verification information associated with the parallel data; and a restoration module configured for, when data in one of the logical pages is damaged, calculating and restoring the damaged data based on the other data and the associated verification information stored in the RAID stripe where the logical page is located.

In accordance with the solid-state storage system according to the present invention, a memory cell of the logic block comprises two of the logical pages that are adjacent to each other, one of which is used for storing low data, and the other one is used for storing high data.

In accordance with the solid-state storage system according to the present invention, the restoration module is further configured for, when the writing of the high data damages the corresponding low data, calculating and restoring the damaged data based on the other data and the associated verification information stored in the RAID stripe where the low data is located.

In accordance with the solid-state storage system according to the present invention, the system further comprises a processing module configured for, when respective logic block for receiving parallel data comprises logical pages which are used for storing high data and have the same page number, selecting one of the logical pages to receive the written data and blocking a request for writing data to the other logical pages with the same page number.

The present invention also provides a storage apparatus comprising the system as described above.

According to the present invention, the logical pages with the same page number in respective logic block of the solid-state storage system are set as one RAID stripe, each RAID stripes can store a set of parallel data and verification information associated with the set of the parallel data. As such, when data in one of the logical pages is damaged, the system can calculate and restore the damaged data based on the other data and the associated verification information stored in the RAID stripe where the logical page is located. Thereby, the present invention can restore the damaged data without additionally increasing hardware cost.

DETAILED DESCRIPTION

To clarify the object, technical solutions and advantages of the present invention, the present invention will be further explained in detail hereinafter with reference to the accompanying drawings and embodiments. It should be appreciated that the specific embodiments described herein are merely intended to illustrate the present invention, but are not limited thereto.

Figure 1:
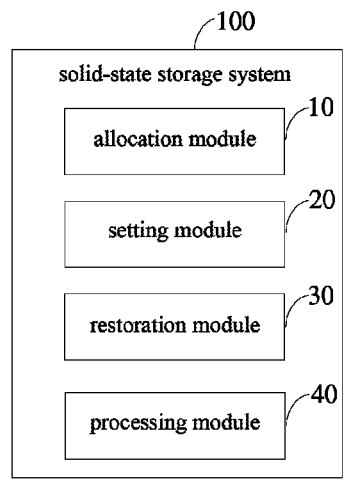
FIG. 1 is a schematic view illustrating a structure of a solid-state storage system according to the present invention.

Referring to FIG. 1, the present invention provides a solid-state storage system 100 which can be applied to a solid-state storage apparatus, such as a solid-state hard disk. A storage portion of the system 100 comprises several logical disks, and the system 100 further comprises an allocation module 10, a setting module 20 and a restoration module 30, details of which will be listed as below.

The allocation module 10 is configured for allocating at least one idle logic block from each of the logical disks, wherein the idle logic block is used for receiving parallel data, and each of the logic blocks comprises several logical pages. Each of the logical disks generally comprises one or more idle logic block(s) indicating that data is allowed to be written and one or more non-idle logic block(s) indicating that data has been written. Upon receipt of a data writing command, the allocation module 10 automatically searches an idle logic block from the logical disks for data writing.

The setting module 20 is configured for setting the logical pages with a same page number in respective logic block as one RAID (Redundant Array of Independent Disks) stripe, wherein each RAID stripe is used for storing a set of parallel data and verification information associated with the parallel data. It should be noted that the verification information associated with respective data is stored in a separate logical disk, rather than be ing stored together with the data, thereby when a piece of data in some logical disk is damaged, the associated verification information would not be damaged and thus it may be used for subsequent restoration of the data.

The restoration module 30 is configured for, when data in one of the logical pages is damaged, calculating and restoring the damaged data based on the other data and the associated verification information stored in the RAID stripe where the logical page is located. As described above, as for a set of parallel data written at the same time, the verification information associated with the data is stored separately from the data, and when the data in some logical page of a logical disk is damaged, the system 100 can calculate and restore the damaged data based on the other data written at the same time and the associated verification information.

The present invention restores the damaged data by way of software calculation, which requires no additional hardware and has high applicability.

Figure 2:
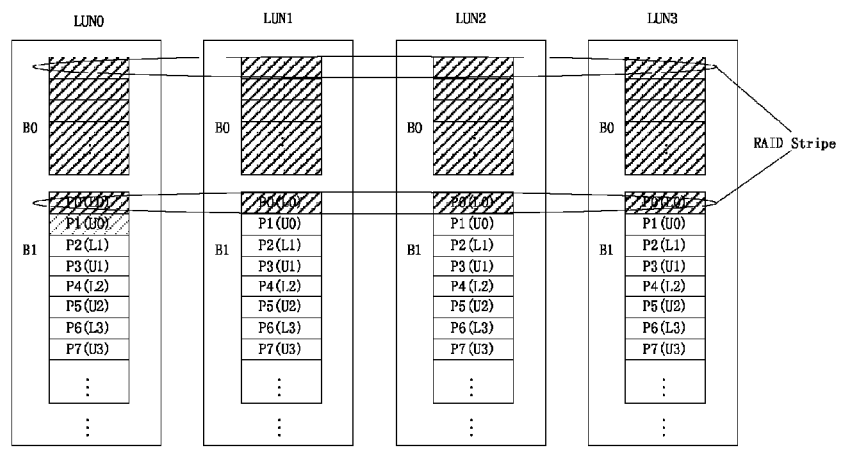
FIG. 2 is a schematic view illustrating a logical structure of a solid-state hard disk system according to an embodiment of the present invention.
Figure 4:
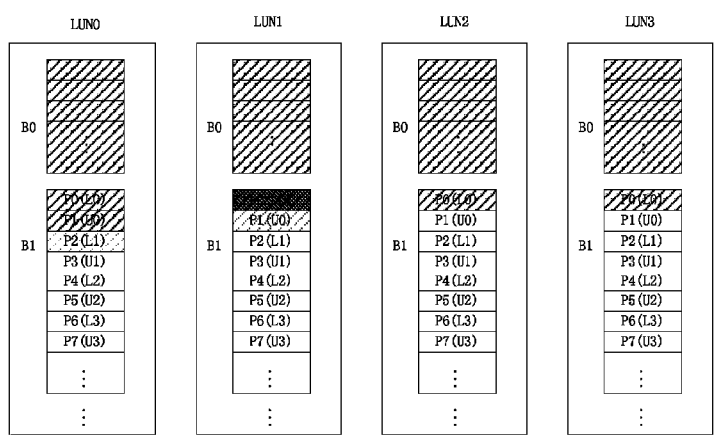
FIG. 4 is a schematic view illustrating a state of writing of data in another embodiment of the present invention.

In an embodiment as shown in FIG. 2, the solid-state storage system 100 comprises four logical disks, wherein logical disks LU0 to LU2 are used for storing data, and logical disk LU3 is used for storing verification information associated with the data. Each of the logical disks comprises two logic blocks B0 and B1, and a basic memory cell of the logic block comprises two adjacent logical pages, e.g. logical pages P0(L0) and P1(U0), one of which is used for storing low data (i.e., low bit data), and the other one is used for storing high data (i.e., high bit data). When the writing of high data to some logic block damages the corresponding low data, the damaged data will be calculated and restored based on the other data and the associated verification information stored in the RAID stripe where the low data is located. As illustrated in FIG. 4, a logical page P0(L0) used for storing low data in a logic block B1 of a logical disk LUN1 is damaged by an unfinished operation of writing data to the P1(U0), for example, a sudden power failure occurs during the writing to the P1(U0). Upon power on, the system 100 can calculate and restore the damaged data based on the other data and associated verification information stored in the RAID stripe where the logical page P0(L0) is located, enabling the solid-state storage system 100 to have data restoration capability.

Figure 3A:
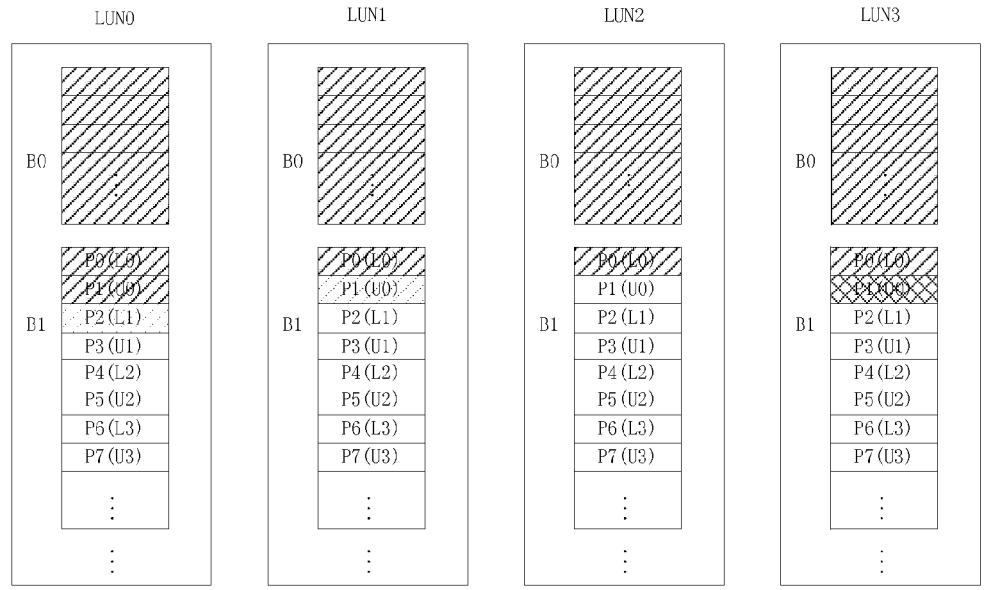
FIG. 3A is a schematic view illustrating a state of writing of first data in an embodiment of the present invention.
Figure 3B:
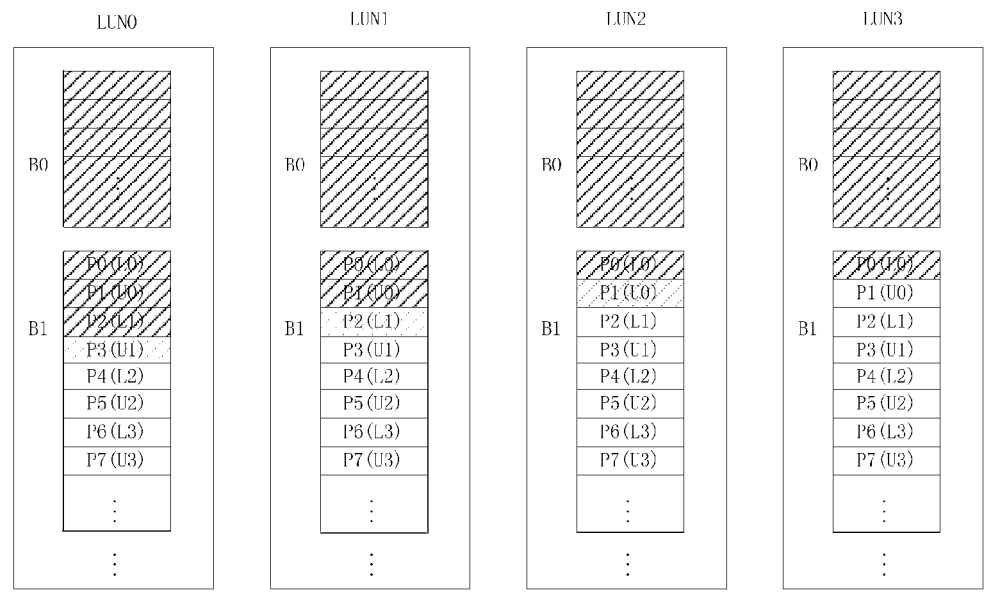
FIG. 3B is a schematic view illustrating a state of writing of second data in the embodiment as shown in FIG. 3A.
Figure 3C:
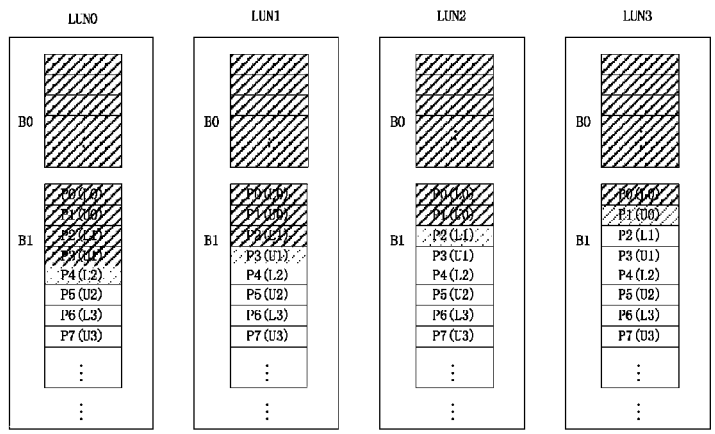
FIG. 3C is a schematic view illustrating a state of writing of third data in the embodiment as shown in FIG. 3A.

Preferably, the solid-state storage system 100 according to the present invention further comprises a processing module 40 configured for, when respective logic block for receiving parallel data comprises logical pages which are used for storing high data and have the same page number, selecting one of the logical pages to receive the written data and blocking a request for writing data to the other logical pages with the same page number. It should be noted that the above blocking processing is only enabled with respect to the current set of data for writing, and when the next set of parallel data is requested to be written, it requires re-determining for a logical page whether data is written or request for writing data is blocked. The specific implementation is shown in FIGS. 3A to 3C. As shown in FIG. 3A, when a set of parallel data is just written to the logical page P1(U0) used for storing high data in the logical disks LU0 to LU3, since the logical pages in respective disk have the same page number, one of the logical pages (as shown in the figure, logical page P1(U0) in the logical disk LU0) is selected to allow data writing, and the request to write data to the other logical pages with the same page number is blocked. FIGS. 3B and 3C each show a subsequent writing process, and the subsequent writing speed is gradually resumed to a normal writing speed.

The present invention also provides a solid-state storage apparatus comprising the above-mentioned system 100, for which the above-mentioned processing method of blocking writing is applied, so as to ensure that high data with the same page number will not be damaged simultaneously in case of power down, and accordingly that low data with the same page number will not be damaged. That is, it is ensured that at most one piece of data in each RAID stripe may be damaged in case of an abnormal power down of the system, thereby the damaged data can be calculated and restored based on the undamaged data and the associated verification information stored in the RAID stripe.

Figure 5:
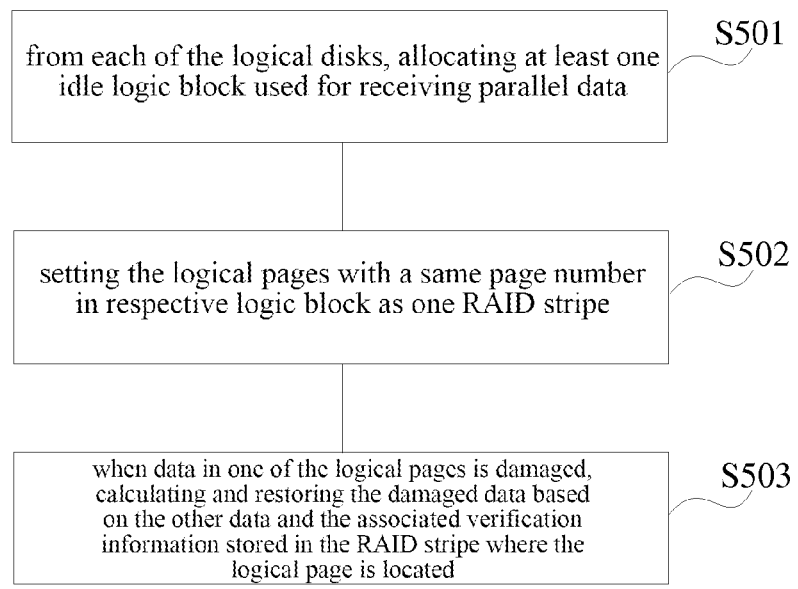
FIG. 5 is a flow chart illustrating a method of writing data according to the present invention.

Referring to FIG. 5, the present invention provides a method of writing data, which may be carried out by means of the system 100 as shown in FIG. 1. The solid-state storage system comprises several logical disks, and the method comprises the steps S501 to S503 as follows.

Step S501: from each of the logical disks, allocating at least one idle logic block used for receiving parallel data, wherein each of the logic blocks comprises several logical pages.

Each of the logical disks generally comprises one or more idle logic block(s) indicating that data is allowed to be written and one or more non-idle logic block(s) indicating that data has been written. Upon receipt of a data writing command, the allocation module 10 automatically searches an idle logic block from the logical disks for data writing. Further, a memory cell of the logic block comprises two of the logical pages that are adjacent to each other, one of which is used for storing low data, and the other one is used for storing high data.

Step S502: setting the logical pages with a same page number in respective logic block as one RAID stripe, wherein each RAID stripe is used for storing a set of parallel data and verification information associated with the parallel data.

It should be noted that the verification information associated with respective data is stored in a separate logical disk, rather than being stored together with the data, thereby when a piece of data in some logical disk is damaged, the associated verification information would not be damaged and thus it may be used for subsequent restoration of the data.

Step S503: when data in one of the logical pages is damaged, calculating and restoring the damaged data based on the other data and the associated verification information stored in the RAID stripe where the logical page is located.

As described above, as for a set of parallel data written at the same time, the verification information associated with the data is stored separately from the data, and when the data in some logical page of a logical disk is damaged, the system 100 can calculate and restore the damaged data based on the other data written at the same time and the associated verification information. In particulars, when the writing of the high data damages the corresponding low data, the damaged data will be calculated and restored based on the other data and the associated verification information stored in the RAID stripe where the low data is located.

Preferably, if respective logic block for receiving parallel data comprises logical pages which are used for storing high data and have the same page number, selecting one of the logical pages to receive the written data and blocking a request for writing data to the other logical pages with the same page number. The specific implementation is shown in FIGS. 3A to 3C. As shown in FIG. 3A, when a set of parallel data is just written to the logical page P1(U0) used for storing high data in the logical disks LU0 to LU3, since the logical pages in respective disk have the same page number, one of the logical pages (as shown in the figure, logical page P1(U0) in the logical disk LU0) is selected to allow data writing, and the request to write data to the other logical pages with the same page number is blocked. FIGS. 3B and 3C each show a subsequent writing process, and the subsequent writing speed is gradually resumed to a normal writing speed. By means of the above-mentioned processing method of blocking writing, it is ensured that high data with the same page number will not be damaged simultaneously in case of power down, and accordingly that low data with the same page number will not be damaged. That is, it is ensured that at most one piece of data in each RAID stripe may be damaged in case of an abnormal power down of the system, thereby the damaged data can be calculated and restored based on the undamaged data and the associated verification information stored in the RAID stripe.

To sum up, according to the present invention, the logical pages with the same page number in respective logic block of the solid-state storage system are set as one RAID stripe, each RAID stripes can store a set of parallel data and verification information associated with the set of the parallel data. As such, when data in one of the logical pages is damaged, the system can calculate and restore the damaged data based on the other data and the associated verification information stored in the RAID stripe where the logical page is located. Thereby, the present invention can restore the damaged data without additionally increasing hardware cost.

Of course, the present invention may have a variety of other embodiments. Those skilled in the art can make all kinds of corresponding changes and modifications according to the present invention without departing from the spirit and essence of the present invention. It is intended that all these changes and modifications are covered by the appended claims of the present invention.

The invention claimed is:

1. A method of writing data to a solid-state storage system which comprises several logical disks, the method comprising the steps of:
   from each of the logical disks, allocating at least one idle logic block used for receiving parallel data, wherein each of the logic blocks comprises several logical pages, a memory cell of the logic block comprises two of the logical pages that are adjacent to each other, one of which is used for storing low data, and the other one is used for storing high data;
   setting the logical pages with a same page number in respective logic block as one RAID stripe, wherein each RAID stripe is used for storing a set of parallel data and verification information associated with the parallel data; and
   when data in one of the logical pages is damaged, calculating and restoring the damaged data based on the other data and the associated verification information stored in the RAID stripe where the logical page is located;
   if respective logic block for receiving parallel data comprises logical pages which are used for storing high data and have the same page number, selecting one of the logical pages to receive the written data and blocking a request for writing data to the other logical pages with the same page number.

2. The method according to claim 1, wherein the step of, when data in one of the logical pages is damaged, calculating and restoring the damaged data based on the other data and the associated verification information stored in the RAID stripe where the logical page is located comprises the step of:
   when the writing of the high data damages the corresponding low data, calculating and restoring the damaged data based on the other data and associated verification information stored in the RAID stripe where the low data is located.

3. A solid-state storage system comprising:
   one or more solid-state hard disks;
   several logical disks;

an allocator to allocate at least one idle logic block from each of the logical disks, wherein the idle logic block is used for receiving parallel data, and wherein each of the logic blocks comprises several logical pages, wherein a memory cell of the logic block comprises two of the logical pages that are adjacent to each other, one of which is used for storing low data, and the other one is used for storing high data;

a setter to set the logical pages with a same page number in respective logic block as one RAID stripe, wherein each RAID stripe is used for storing a set of parallel data and verification information associated with the parallel data;

a restorer to, when data in one of the logical pages is damaged, calculate and restore the damaged data based on the other data and the associated verification information stored in the RAID stripe where the logical page is located; and a selector to, when respective logic block for receiving parallel data comprises logical pages which are used for storing high data and have the same page number, select one of the logical pages to receive the written data and blocking a request for writing data to the other logical pages with the same page number.

4. The solid-state storage system according to claim 3, wherein the restorer, when the writing of the high data damages the corresponding low data, calculates and restores the damaged data based on the other data and the associated verification information stored in the RAID stripe where the low data is located.

5. A storage apparatus comprising the system according to claim 3.

6. A storage apparatus comprising the system according to claim 4.

* * * * *